(12) United States Patent
Higuchi

(10) Patent No.: US 10,618,431 B2
(45) Date of Patent: Apr. 14, 2020

(54) SLIDING DEVICE FOR A VEHICLE SEAT

(71) Applicant: TOYOTA BOSHOKU KABUSHIKI KAISHA, Aichi (JP)

(72) Inventor: Tadasuke Higuchi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/205,730

(22) Filed: Nov. 30, 2018

(65) Prior Publication Data

US 2019/0168641 A1 Jun. 6, 2019

(30) Foreign Application Priority Data

Dec. 1, 2017 (JP) ................................. 2017-231671

(51) Int. Cl.
*B60N 2/07* (2006.01)
*B60N 2/02* (2006.01)
*B60N 2/075* (2006.01)

(52) U.S. Cl.
CPC ......... *B60N 2/0727* (2013.01); *B60N 2/0232* (2013.01); *B60N 2/075* (2013.01); *B60N 2002/0236* (2013.01)

(58) Field of Classification Search
CPC .... B60N 2/0727; B60N 2/0232; B60N 2/075; B60N 2002/0236; B60N 2/067; B60N 2/0843; B60N 2/0825; B60N 2/06; F16H 1/20; F16H 19/04
USPC .................................. 248/424, 425, 428, 429
See application file for complete search history.

(56) References Cited

U.S. PATENT DOCUMENTS

| | | | | |
|---|---|---|---|---|
| 2,930,428 | A * | 3/1960 | De Rose | B60N 2/0232 248/394 |
| 9,789,965 | B2 * | 10/2017 | Benthien | B60N 2/072 |
| 9,827,879 | B2 | 11/2017 | Fujita et al. | |
| 9,994,130 | B2 * | 6/2018 | Michels | B60N 2/14 |
| 10,220,732 | B2 * | 3/2019 | Auer | B60N 2/0727 |
| 2011/0062285 | A1 * | 3/2011 | Herzog | B64D 11/00 244/118.6 |
| 2015/0045168 | A1 * | 2/2015 | Kienke | B60N 2/0224 475/149 |
| 2015/0069807 | A1 * | 3/2015 | Kienke | B60N 2/0232 297/344.1 |
| 2015/0289665 | A1 * | 10/2015 | Klimm | F16H 19/04 74/89.14 |
| 2016/0114703 | A1 * | 4/2016 | Fujita | B60N 2/0232 297/344.1 |
| 2017/0184151 | A1 * | 6/2017 | Huang | F16C 29/008 |
| 2017/0368962 | A1 * | 12/2017 | Auer | B60N 2/0727 |

(Continued)

FOREIGN PATENT DOCUMENTS

JP 2015-116833 6/2015

*Primary Examiner* — Nkeisha Smith
(74) *Attorney, Agent, or Firm* — Greenblum & Bernstein, P.L.C.

(57) ABSTRACT

A sliding device of the present disclosure includes: a fixed rail; a movable rail; a rack fixed within the fixed rail, the rack extending along an axis parallel to a longitudinal axis of the fixed rail; a pinion provided to the movable rail, the pinion including multiple teeth to be engaged with the rack and rotating by receiving a driving force; and a restrictor slidingly displaced integrally with the movable rail, the restrictor contacting with the rack when the movable rail is sliding, to thereby restrict the rack from being displaced in a direction away from the pinion.

6 Claims, 12 Drawing Sheets

(56) References Cited

U.S. PATENT DOCUMENTS

2018/0334054 A1* 11/2018 Higuchi ............... B60N 2/0232
2019/0093738 A1* 3/2019 Almqvist ............. B25H 1/0064

* cited by examiner

SLIDING DEVICE FOR A VEHICLE SEAT

CROSS-REFERENCE TO RELATED APPLICATIONS

This application claims the benefit of Japanese Patent Application No. 2017-231671 filed on Dec. 1, 2017 with the Japan Patent Office, the entire disclosure of which is incorporated herein by reference.

BACKGROUND

The present disclosure relates to a sliding device that supports a vehicle seat in a slidable manner.

For example, a sliding device disclosed in Japanese Unexamined Patent Application Publication No. 2015-116833 comprises: a rack fixed to an external side surface of a fixed rail; and a pinion to be displaced integrally with a movable rail.

SUMMARY

A force to slide the movable rail is an engagement pressure generated between the pinion and the rack with rotation of the pinion. In a case where engagement between the pinion and the rack is improper, loud operating noise and large vibration may be generated when the sliding device is operated.

The present disclosure discloses an example of a sliding device with a rack fixed within a fixed rail whereby reducing operating noise and vibration to be generated during operation of the sliding device.

For example, it is desirable that a sliding device comprise: a rack fixed within a fixed rail, the rack extending along an axis parallel to a longitudinal axis of the fixed rail; a pinion provided to a movable rail, the pinion comprising multiple teeth to be engaged with the rack and rotating by receiving a driving force; and a restrictor slidingly displaced integrally with the movable rail, the restrictor contacting with the rack when the movable rail is sliding, to thereby restrict the rack from being displaced in a direction away from the pinion.

In the thus-configured sliding device, the rack is restricted from being spaced apart from the pinion, thus inhibiting improper engagement between the pinion and the rack. Accordingly, in the above-described sliding device, operating noise and vibration to be generated during operation can be reduced.

The sliding device may be configured as below. It is desirable that a rotation center of the pinion be positioned upper than the rack, and that the restrictor comprise a first sliding-contact portion that is slidingly contactable with at least part of a lower surface of the rack. This can inhibit downward displacement of the rack, thus reliably inhibiting improper engagement between the pinion and the rack.

Assuming that a horizontal axis substantially perpendicular to a longitudinal axis of the rack is a width axis, it is desirable that the first sliding-contact portion be slidingly contactable with the rack over an entire range along the width axis. This can reliably inhibit improper engagement between the pinion and the rack.

It is desirable that the restrictor comprise: a second sliding-contact portion that is slidingly contactable with one width-axis end side of the rack; and a third sliding-contact portion that is slidingly contactable with another width-axis end side of the rack. This can inhibit the rack from being displaced along the width axis, thus reliably inhibiting improper engagement between the pinion and the rack.

It is desirable that the sliding device further comprise a support member that is fixed to the movable rail and supports the pinion, and that the restrictor be provided to the support member. This enables smaller deviation of a relative position between the pinion and the rack, as compared with a configuration in which the restrictor is provided to a member different from a member that supports the pinion. Thus, improper engagement between the pinion and the rack can be reliably inhibited.

The above-described sliding device is especially effective when it is applied to a sliding device comprising a rack configured with a strip-plate-shaped member containing multiple holes into which the multiple teeth of the pinion are insertable.

Specifically, when subjected to pressure from the pinion, the thus-configured rack may be deformed greatly to be spaced apart from the pinion. Thus, with the sliding device provided with the restrictor, improper engagement between the pinion and the rack can be reliably inhibited.

BRIEF DESCRIPTION OF THE DRAWINGS

An example embodiment of the present disclosure will be described below with reference to the accompanying drawings, in which.

DETAILED DESCRIPTION OF THE PREFERRED EMBODIMENTS

Figure 1:
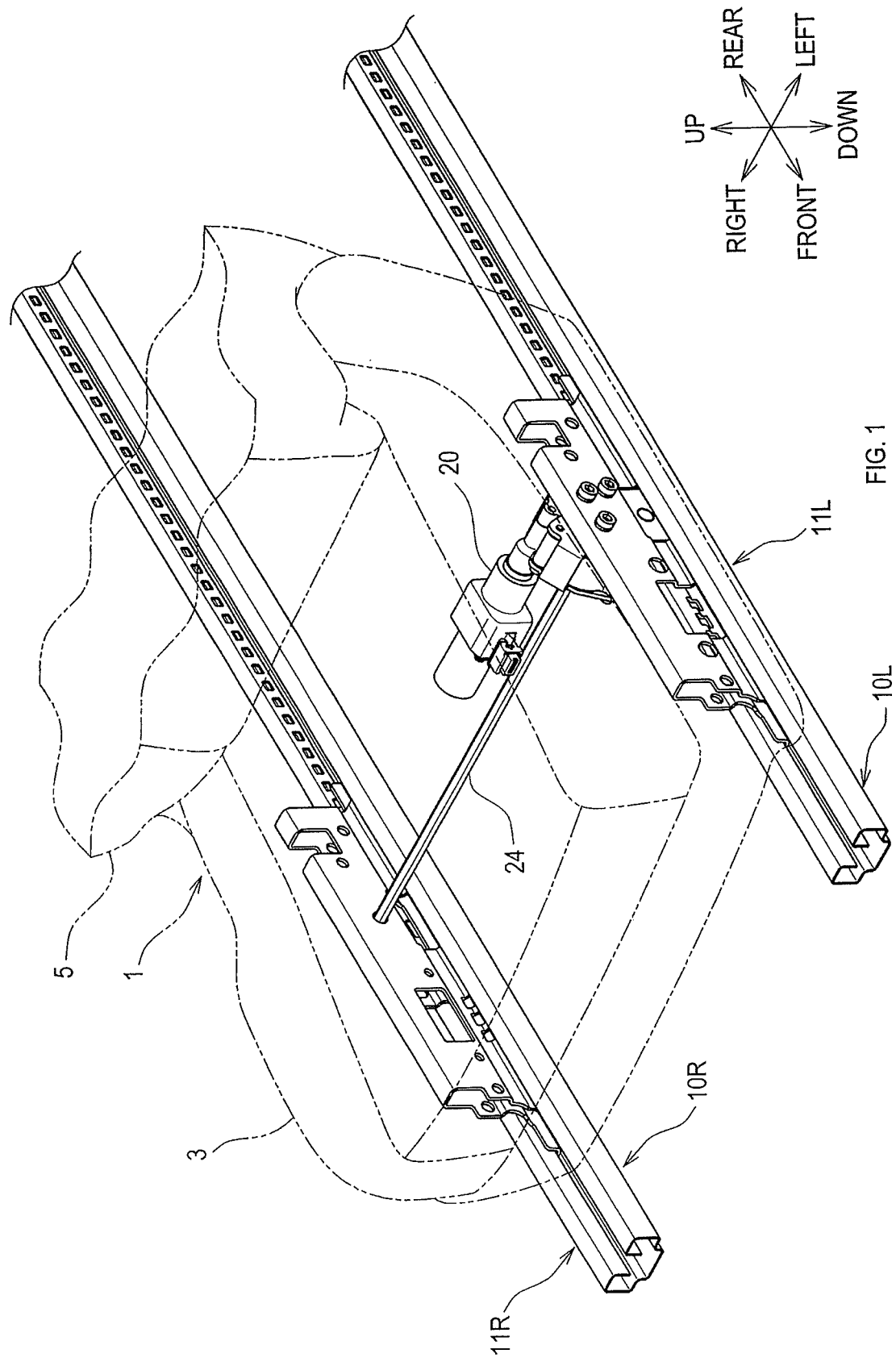
FIG. 1 is a diagram showing a vehicle seat and a sliding device according to an embodiment.

"Embodiments" described below are examples. The present disclosure is not limited to specific configurations, structures, and the like, shown in the below-described embodiments.

In the present embodiment, an explanation will be given of an example of a seat (hereinafter referred to as a vehicle seat) mounted to a vehicle such as an automobile. Arrows and so on indicating directions shown in the drawings are provided for the purpose of easy understanding of mutual relationships between the drawings.

The present disclosure is not limited by the directions shown in the drawings. The directions shown in the drawing are based on a state where the vehicle seat according to the present embodiment is mounted in the vehicle.

1. Overview of Vehicle Seat

As shown in FIG. 1, a vehicle seat 1 comprises a seat cushion 3 and a seatback 5. The seat cushion 3 supports an occupant's buttocks. The seatback 5 supports the occupant's back.

The vehicle seat 1 is fixed to a vehicle via sliding devices 10R and 10L arranged respectively on one end side in seat-width directions (on the right end side, in the present embodiment) and on the other end side in the seat-width directions (on the left end side, in the present embodiment). The sliding devices 10R and 10L support the vehicle seat 1 in a slidable manner.

2. Configuration of Sliding Device

2.1 Overview of Sliding Device

The sliding device 10R comprises a support unit 11R. The sliding device 10L comprises a support unit 11L and a drive unit 20.

The support unit 11R and the support unit 11L have the same structure. The detailed structure will be described below focusing on the sliding device 10L.

2.2 Details of Sliding Device

<Support Unit>

Figure 2:
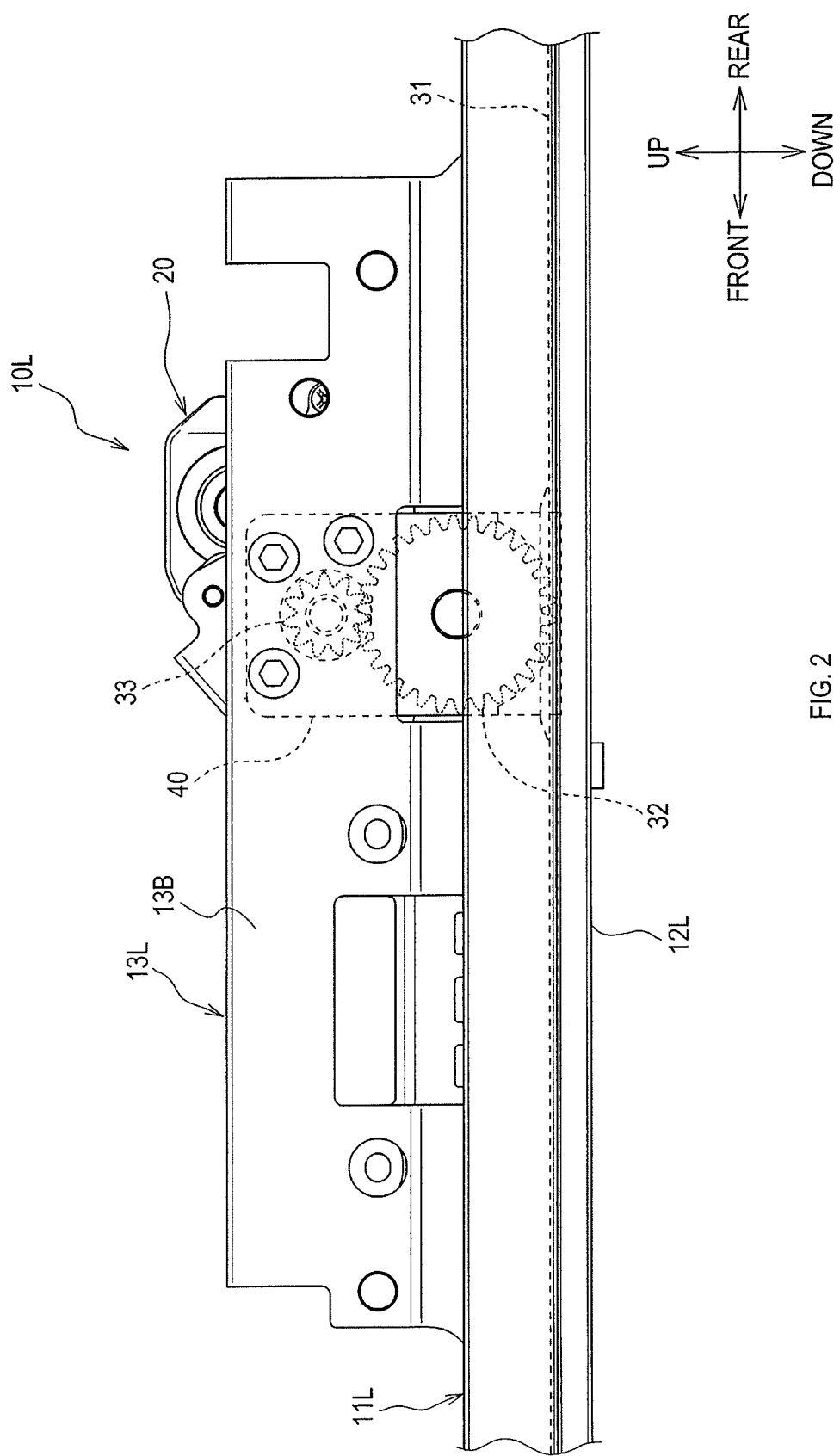
FIG. 2 is a side view of the sliding device according to the embodiment.

As shown in FIG. 2, the support unit 11L comprises a fixed rail 12L and a movable rail 13L. The fixed rail 12L is fixed directly or indirectly to the vehicle.

The movable rail 13L is a member to which the vehicle seat 1 is fixed and that is slidable relative to the fixed rail 12L. The vehicle seat 1 is mounted to the vehicle via the support unit 11L (and the support unit 11R) in a slidable manner.

<Sliding Drive Mechanism>

Figure 3:
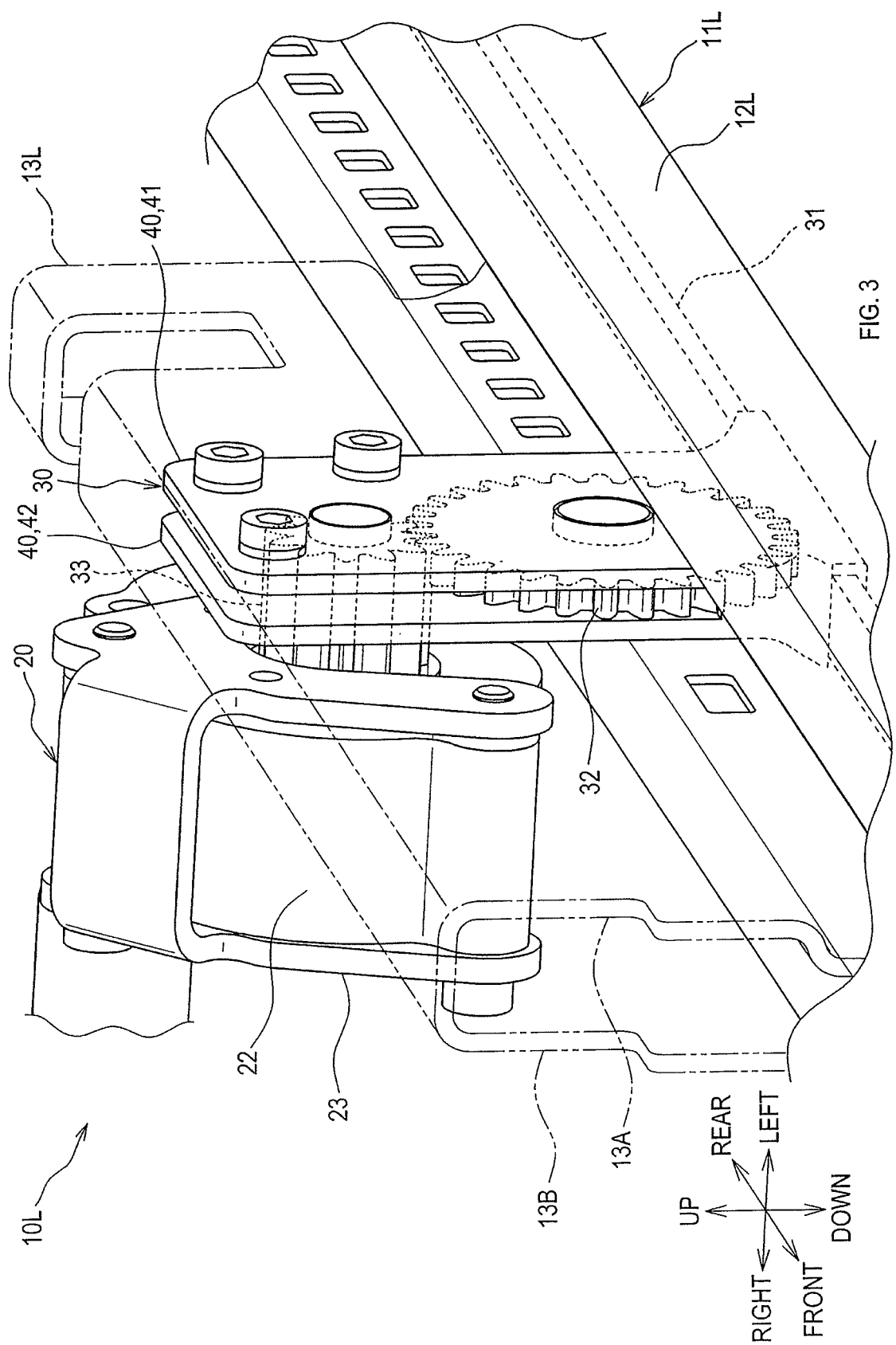
FIG. 3 is a diagram showing the sliding device according to the embodiment.

A sliding drive mechanism 30 causes sliding displacement of the movable rail 13L. As shown in FIG. 3, the sliding drive mechanism 30 comprises the drive unit 20, a rack 31, and a pinion 32.

Figure 4:
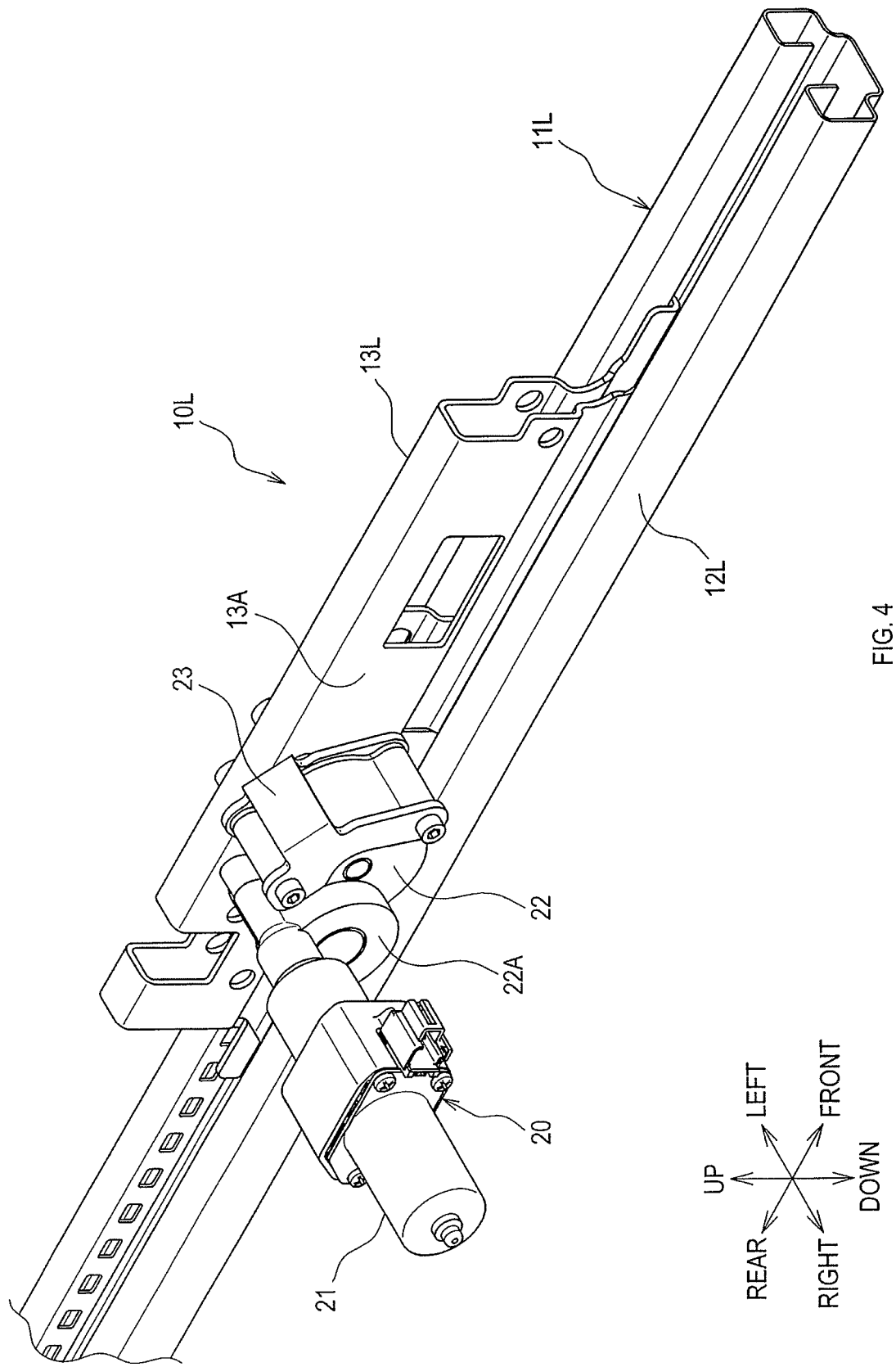
FIG. 4 is a diagram showing the sliding device according to the embodiment.

The drive unit 20 generates a driving force that rotates the pinion 32. As shown in FIG. 4, the drive unit 20 comprises an electric motor 21, a deceleration mechanism 22, and a bracket 23. The deceleration mechanism 22 is a gear mechanism that decelerates a rotational force generated in the electric motor 21 and that outputs the decelerated rotational force.

The electric motor 21 and the deceleration mechanism 22 are integrated via a gear casing 22A in which the deceleration mechanism 22 is housed. The bracket 23 is used to fix the drive unit 20 to the movable rail 13L.

Figure 5:
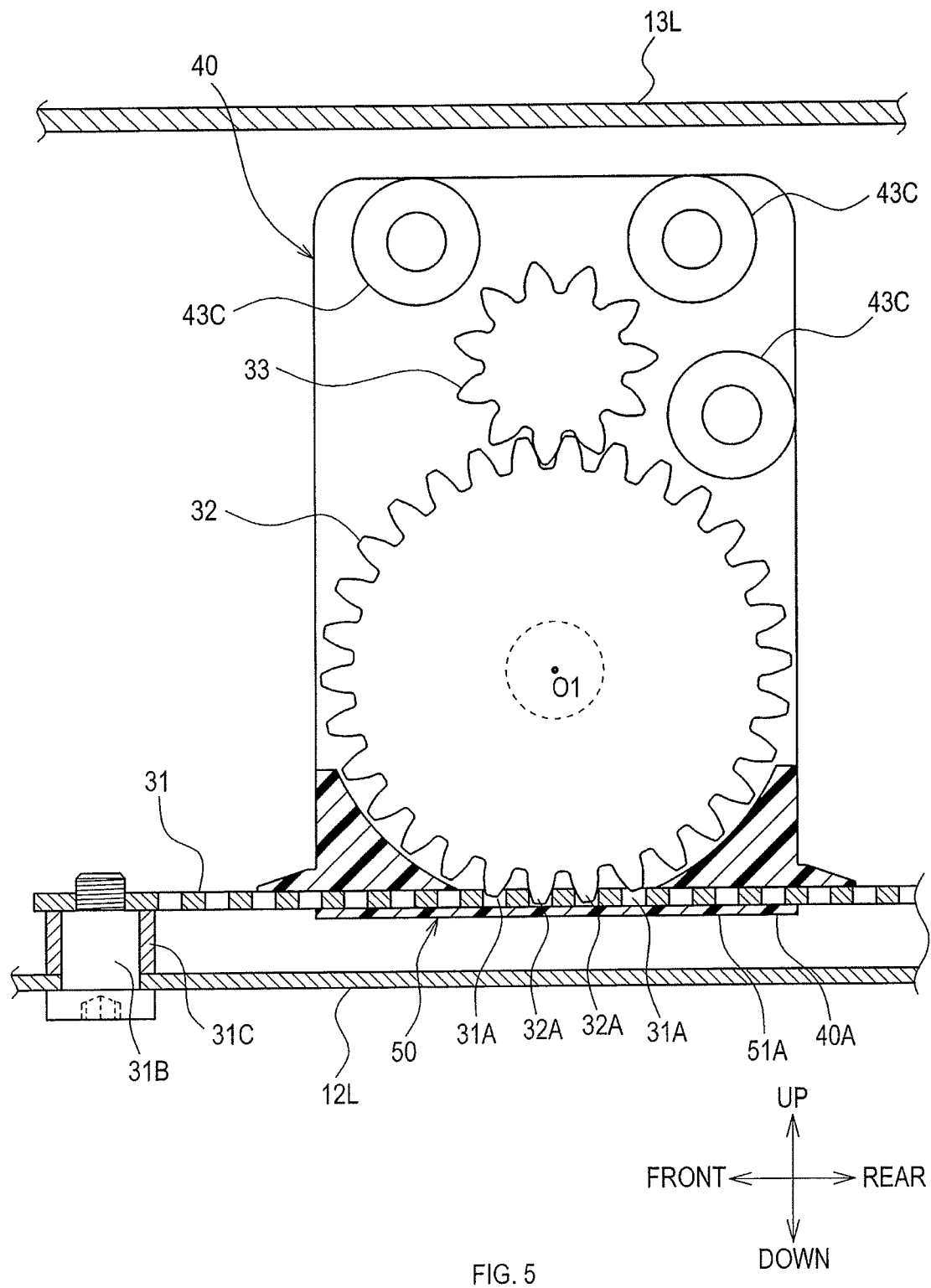
FIG. 5 is a diagram showing an engagement state of an intermediate gear, a pinion, and a rack in the sliding device according to the embodiment.

As shown in FIG. 2, the rack 31, which is a gear having an infinite radius, extends along an axis parallel to a longitudinal axis of the fixed rail 12L in a state fixed within the fixed rail 12L. As shown in FIG. 5, the pinion 32 is a gear arranged upper than the rack 31 and engaged with the rack 31.

Figure 6:
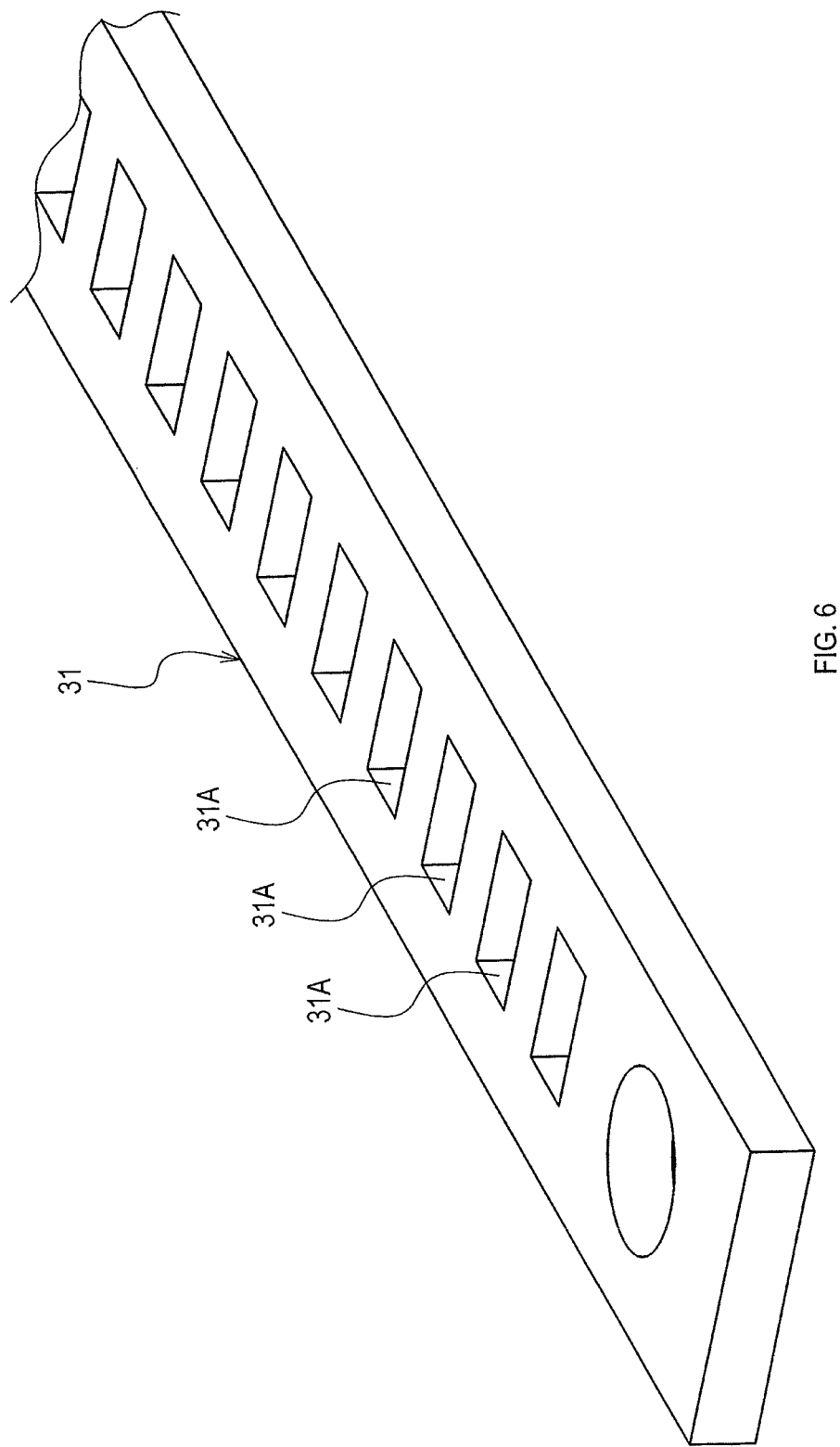
FIG. 6 is a diagram showing the rack according to the embodiment.

The pinion 32, which is a gear having a finite radius of curvature, has multiple teeth 32A to be engaged with the rack 31, and the rotation center O1 of the pinion 32 is positioned upper than the rack 31. As shown in FIG. 6, the rack 31 is a strip-plate-shaped member containing multiple holes 31A into which the respective teeth 32A are insertable.

The rack 31 is obtained by performing press-forming or the like on a metal strip plate, such as a rolled steel plate, so as to arrange the multiple holes 31A therein. As shown in FIG. 5, longitudinal both ends of the rack 31 are each fixed to the fixed rail 12L via a fixing device 31B, such as a bolt or a pin. A collar 31C is a tubular member restricting a vertical position of the rack 31.

An intermediate gear 33 rotates by receiving the driving force from the drive unit 20 while being engaged with the pinion 32. The intermediate gear 33 transmits the driving force to the pinion 32 by rotating by receiving the driving force from the drive unit 20. The intermediate gear 33 also serves as an output gear for the drive unit 20 (see FIG. 7).

The driving force transmitted to the intermediate gear 33 is also transmitted to the sliding device 10R through a drive shaft 24 (see FIG. 1). Thus, the two sliding devices 10R and 10L are operated in a mechanically synchronized manner.

<Support Member>

Figure 8:
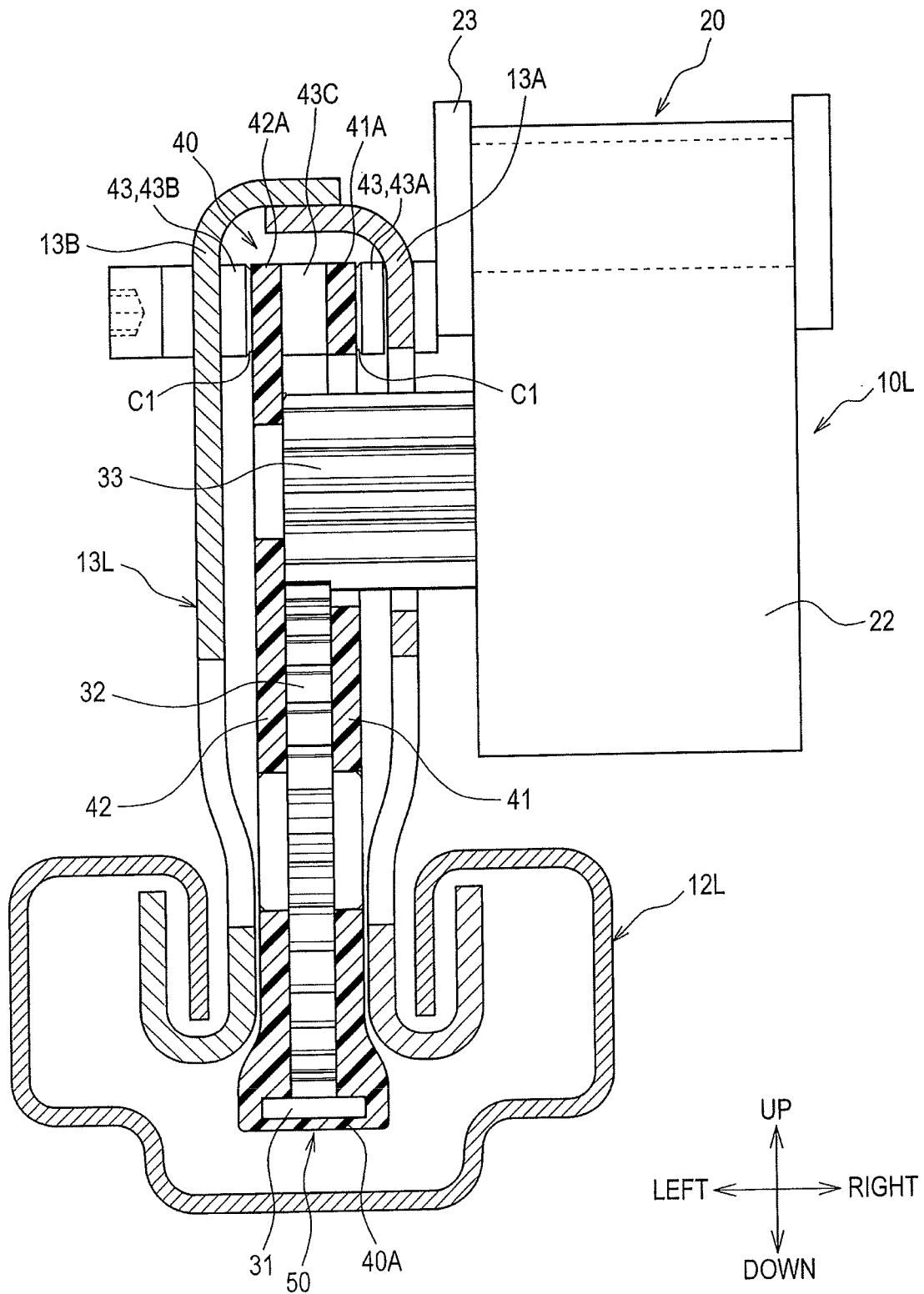
FIG. 8 is a diagram showing the structure of a support member according to the embodiment.
Figure 9:
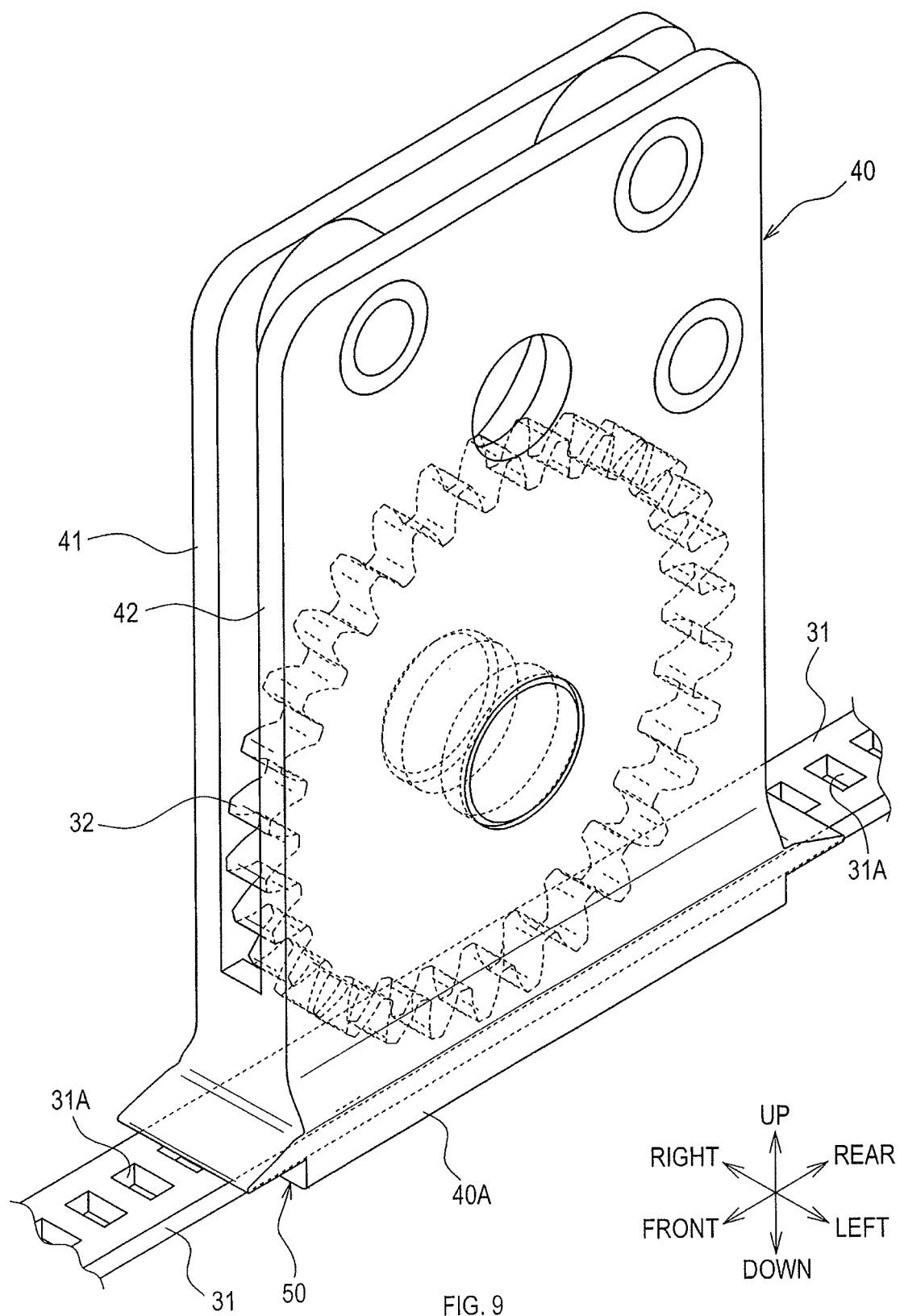
FIG. 9 is a perspective view showing the structure of the support member according to the embodiment.

As shown in FIGS. 8 and 9, a support member 40 supports the pinion 32 and the intermediate gear 33 in a rotatable manner. The support member 40 comprises a first support 41 and a second support 42.

The first support 41 and the second support 42 (i.e., the support member 40) constitute a one-piece article integrally formed of resin or metal (resin, in the present embodiment). The first support 41 is an elastically deformable plate-like member that supports one central-axis end side of the pinion 32 (the right end side in FIG. 8). One central-axis end side of the intermediate gear 33 (the right end side in FIG. 8) is rotatably supported by the gear casing 22A (see FIG. 4).

The second support 42 is an elastically deformable plate-like member that supports the other central-axis end side of the pinion 32 and the other central-axis end side of the intermediate gear 33 (the left end sides in FIG. 8). Along a central axial of the pinion 32, the first support 41 is positioned on a side opposite the second support 42 with the pinion 32 therebetween.

A lower end 40A of the first support 41 and the second support 42 (i.e., of the support member 40) is positioned lower than the pinion 32. The first support 41 and the second support 42 are integrated by being linked together below the pinion 32 (on the side closer to the lower end 40A, in the present embodiment).

As shown in FIG. 9, the support member 40 projected on an imaginary plane perpendicular to an extending axis of the rack 31 has a substantially U-shape linked on the side closer to the rack 31. As shown in FIG. 8, the lower end 40A of the support member 40 is positioned lower than the rack 31.

An upper end of the support member 40 (an upper end 41A of the first support 41 and an upper end 42A of the second support 42) is positioned within the movable rail 13L (between a first wall 13A and a second wall 13B). The first wall 13A constitutes a part of the movable rail 13L, and is spaced apart from the first support 41, on a side opposite the second support 42 with the first support 41 therebetween.

The second wall 13B constitutes a part of the movable rail 13L, and is spaced apart from the second support 42, on a side opposite the first support 41 with the second support 42 therebetween. The first wall 13A and the second wall 13B are joined at upper ends thereof by welding or via a joining device such as a fastener.

A first spacer 43A is arranged between the first wall 13A and the first support 41. A second spacer 43B is arranged between the second wall 13B and the second support 42. The first spacer 43A and the second spacer 43B are examples of a restrictor 43.

The restrictor 43 restricts elastic displacement that spaces the upper end 41A of the first support 41 and the upper end 42A of the second support 42 apart from each other. The first wall 13A and the second wall 13B are metal members joined together at the upper ends thereof to form a substantially U-shape.

Since the first spacer 43A is arranged between the first wall 13A and the first support 41, the first support 41 is restricted from being displaced greatly toward the first wall 13A so as to be spaced apart from the second support 42.

Similarly, since the second spacer 43B is arranged between the second wall 13B and the second support 42, the second support 42 is restricted from being displaced greatly toward the second wall 13B so as to be spaced apart from the first support 41.

<Structure for Fixation of Support Member>

Figure 10:
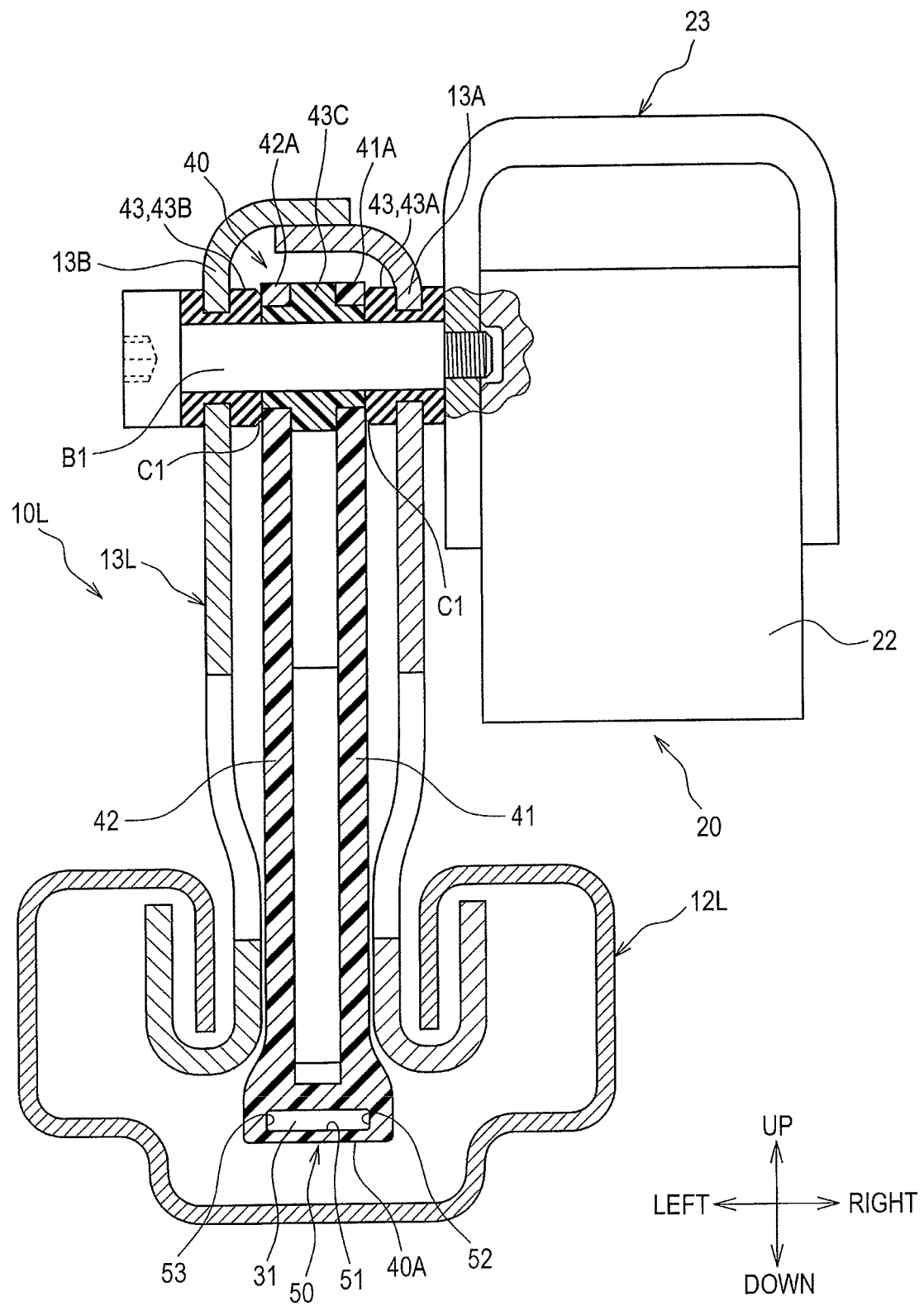
FIG. 10 is a diagram showing the structure of the support member according to the embodiment.

The support member 40 is fixed to the movable rail 13L in a state arranged within the movable rail 13L. Specifically, as shown in FIG. 10, the support member 40 is fixed to the movable rail 13L by a bolt (a bolt with locking holes, in the present embodiment) B1 extending along an axis parallel to the central axis of the pinion 32.

The bolt B1 passes through the first spacer 43A, the second spacer 43B, the first support 41, the second support 42, the first wall 13A, and the second wall 13B, and is coupled to the bracket 23 of the drive unit 20.

The bolt B1 fixes the support member 40 to the movable rail 13L, and fixes the drive unit 20 to the movable rail 13L. Arranged between the first support 41 and the second support 42 is a third spacer 43C made of resin. The bolt B1 also passes through the third spacer 43C.

Figure 11:
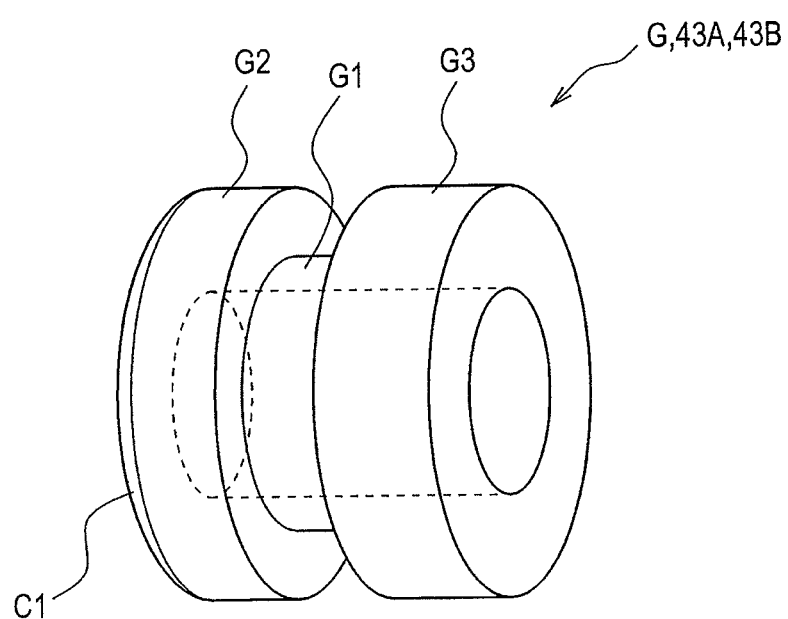
FIG. 11 is a diagram showing a grommet according to the embodiment.

The first spacer 43A and the second spacer 43B are each configured as a grommet G shown in FIG. 11. The grommet G comprises a pipe section G1 of a tubular shape and, at both ends thereof, flanges G2 and G3 shaped like discs.

The pipe section G1 and the flanges G2 and G3 constitute a one-piece article integrally formed of resin such as rubber. In the present embodiment, the flange G2 of the grommet G is used as the first spacer 43A and the second spacer 43B.

The flange G2 comprises a chamfer C1 of a tapered shape. As shown in FIG. 10, the chamfer C1 is provided to the flange G2 on an end surface side thereof to contact with the first support 41 or the second support 42.

Figure 7:
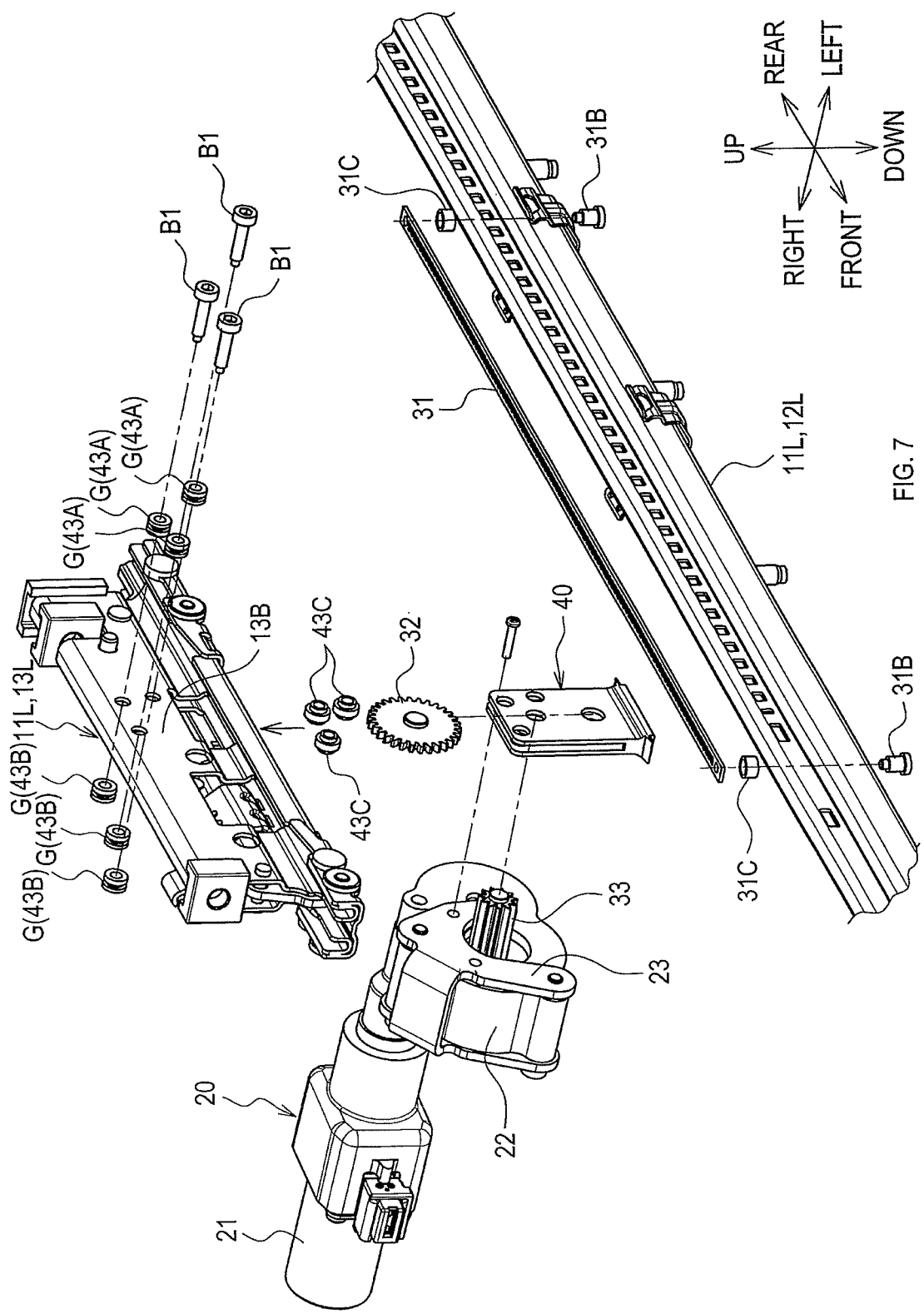
FIG. 7 is an exploded perspective view of the sliding device according to the embodiment.

In the present embodiment, as shown in FIG. 7, the support member 40 and the drive unit 20 are fixed to the movable rail 13L by the three bolts B1. Thus, the first spacer 43A and the second spacer 43B (the grommets G) and the third spacer 43C are also each three in number.

<Structure for Restricting Position of Rack>

As shown in FIG. 5, the support member 40 comprises a restrictor 50 on the side closer to the lower end 40A. The restrictor 50 contacts with the rack 31 at least when the movable rail 13L is sliding (when the pinion 32 is rotating) to thereby restrict the rack 31 from being displaced in a direction away from the pinion 32.

As shown in FIG. 10, the restrictor 50 comprises a first sliding-contact portion 51, a second sliding-contact portion 52, and a third sliding-contact portion 53. The first sliding-contact portion 51 is slidingly contactable with at least part of a lower surface of the rack 31 (see FIG. 5).

Assuming that a horizontal axis substantially perpendicular to a longitudinal axis of the rack 31 is a width axis, as shown in FIG. 10, the first sliding-contact portion 51 is slidingly contactable with the lower surface of the rack 31 over the entire range along the width axis.

The second sliding-contact portion 52 is slidingly contactable with one width-axis end side of the rack 31 (the right end side, in the present embodiment). The third sliding-contact portion 53 is slidingly contactable with the other width-axis end side of the rack 31 (the left end side, in the present embodiment).

Portions of the first sliding-contact portion 51, the second sliding-contact portion 52, and the third sliding-contact portion 53 to come in sliding contact with the rack 31 are provided over the entire region along a longitudinal axis of the support member 40. The longitudinal axis of the support member 40 means an axis parallel to the longitudinal axis of the rack 31.

The first sliding-contact portion 51, the second sliding-contact portion 52, and the third sliding-contact portion 53 are part of a wall forming a through hole passing along the longitudinal axis through the support member 40 on the side thereof closer to the lower end 40A (see FIG. 10). The sectional shape of the through hole is substantially congruent with a cross-sectional shape of the rack 31.

3. Features of Sliding Device of Present Embodiment 3.1 Support Member, etc.

In the sliding device 10L, the driving force from the drive unit 20 is transmitted to the pinion 32 via the intermediate gear 33. Thus, the drive unit 20 is arranged in a position spaced apart from the pinion 32 as compared with a configuration in which, for example, an output shaft of the electric motor 21 is engaged with a rotation center shaft of the pinion 32. Accordingly, in the sliding device 10L, interference between the drive unit 20 and the fixed rail 12L can be avoided.

If a relative position of the intermediate gear 33 with respect to the pinion 32 deviates greatly, loud operating noise and large vibration are generated when the sliding device 10L is operated.

To cope with this, in the sliding device 10L of the present embodiment, the one-piece article is employed in which the first support 41 and the second support 42 are integrally formed (hereinafter referred to as an integrated configuration).

This enables smaller deviation dimension of the relative position of the intermediate gear 33 with respect to the pinion 32 (hereinafter referred to as a dimension of variation) as compared with a configuration in which the first support 41 and the second support 42 are assembled together (hereinafter referred to as an assembled configuration). Thus, improper engagement between the pinion 32 and the intermediate gear 33 is inhibited.

Specifically, the dimension of variation in the assembled configuration is an integrated value of a dimensional variation of the first support 41, a dimensional variation of the second support 42, an assembly variation that occurs during the assembling operation, and so on. In contrast, the dimension of variation in the integrated configuration is only a dimensional variation of a single component integrally formed. Consequently, the dimension of variation in the integrated configuration is smaller than that in the assembled configuration.

Figure 12:
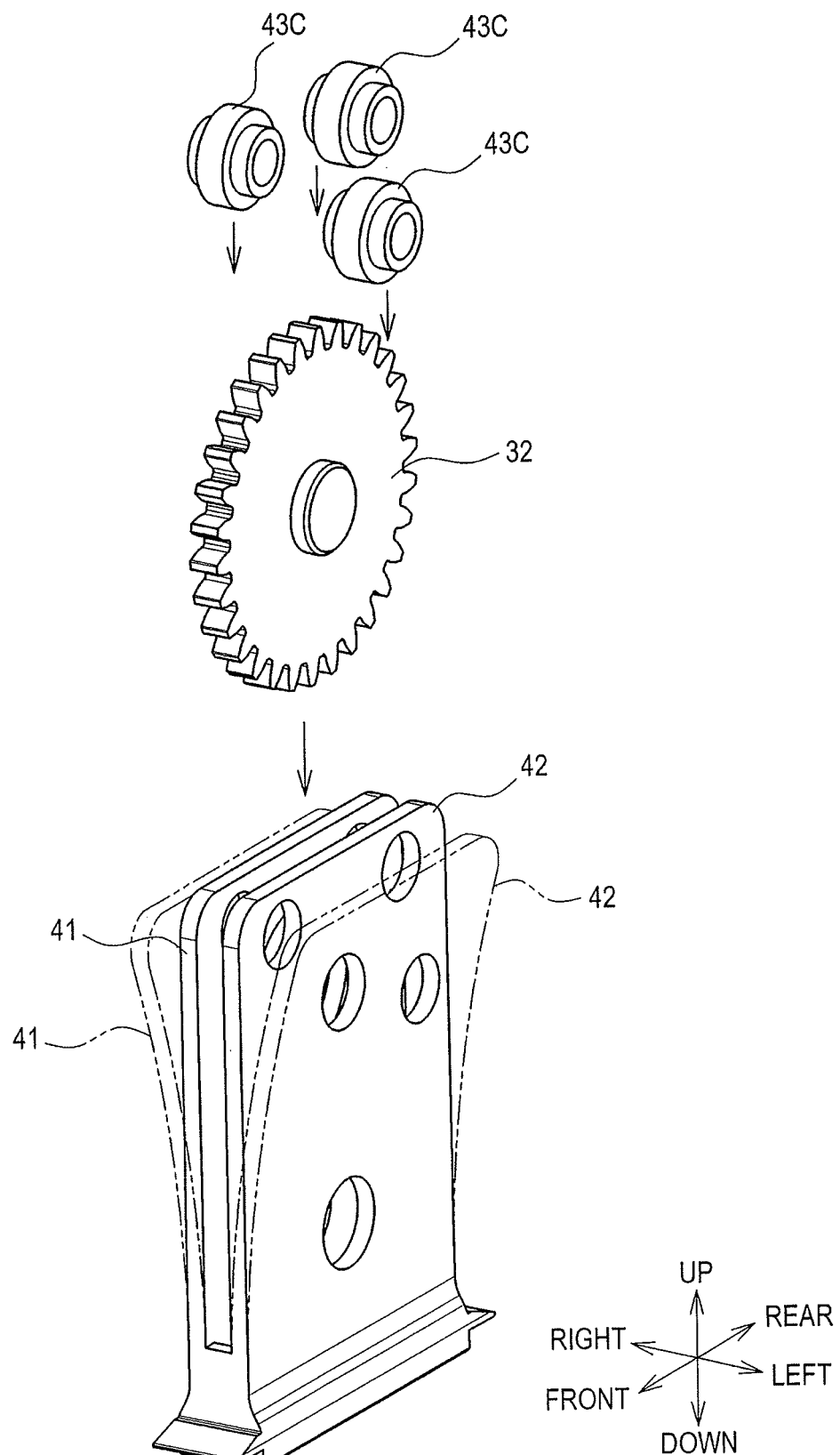
FIG. 12 is a diagram explaining a way of assembling the support member, the pinion, and so on together according to the embodiment.

An assembler or an assembling device (hereinafter referred to as an operator or the like) that mounts the pinion 32 to the support member 40 spaces the upper end 41A of the first support 41 and the upper end 42A of the second support 42 apart from each other by elastically deforming the first support 41 and the second support 42 as shown by two-dot chain lines in FIG. 12. While keeping such a state, the operator or the like mounts the pinion 32 and the three third spacers 43C to the first support 41 and the second support 42.

After such assembling operation, the operator or the like mounts the restrictor 43 (the first spacer 43A and the second spacer 43B) to the upper end 41A of the first support 41 and to the upper end 42A of the second support 42, respectively. Then, the operator or the like inserts the bolt B1 to thereby fix the support member 40 and the drive unit 20 to the movable rail 13L (see FIG. 10).

In this way, the upper end 41A of the first support 41 and the upper end 42A of the second support 42 are restricted from being spaced apart from each other. Consequently, the pinion 32 is inhibited from disengaging from the first support 41 and the second support 42 after completion of the assembling operation.

The restrictor 43 is configured with the first spacer 43A and the second spacer 43B. In such a configuration, elastic displacement of the upper end 41A of the first support 41 and the upper end 42A of the second support 42 is restricted by the movable rail 13L. This enables inhibition of increase in the number of components of the restrictor 43, assembling man-hours, and so on.

The bolt B1 for fixing the drive unit 20 to the movable rail 13L extends along the axis parallel to the central axis of the pinion 32, and passes through the first spacer 43A, the second spacer 43B, the first support 41, the second support 42, the first wall 13A, and the second wall 13B. The first spacer 43A and the second spacer 43B are elastic members made of rubber or the like.

In such a configuration, the first spacer 43A and the second spacer 43B are fixed to the movable rail 13L together with the drive unit 20 by the bolt B1; thus, the structure for fixation of the restrictor 43 can be simplified. Additionally, vibration generated during operation of the drive unit 20 is absorbed by the first spacer 43A and the second spacer 43B made of rubber.

The first support 41 and the second support 42 constitute a one-piece article formed of resin. This improves productivity of the support member 40, and inhibits increased production cost of the support member 40.

3.2 Structure for Restricting Position of Rack

Since the sliding device 10L of the present embodiment comprises the restrictor 50, the rack 31 is restricted from being spaced apart from the pinion 32. This inhibits improper engagement between the pinion 32 and the rack 31. Thus, operating noise and vibration to be generated during operation of the sliding device 10L can be reduced.

The restrictor 50 comprises the first sliding-contact portion 51 that is slidingly contactable with at least part of the lower surface of the rack 31. This can inhibit downward displacement of the rack 31, thus reliably inhibiting improper engagement between the pinion 32 and the rack 31.

The first sliding-contact portion 51 is slidingly contactable with the rack 31 over the entire range along the width axis. This can reliably inhibit improper engagement between the pinion 32 and the rack 31.

The restrictor 50 comprises the second sliding-contact portion 52 and the third sliding-contact portion 53. This can inhibit the rack 31 from being displaced along the width axis, thus reliably inhibiting improper engagement between the pinion 32 and the rack 31.

The restrictor 50 is provided to the support member 40. This enables smaller deviation of the relative position between the intermediate gear 33, the pinion 32, and the rack 31, as compared with a configuration in which the restrictor 50 is provided to a member different from a member that supports the pinion 32 and the intermediate gear 33. Thus, improper engagement between the intermediate gear 33, the pinion 32, and the rack 31 can be reliably inhibited.

The rack 31 is a strip-plate-shaped member and, as shown in FIG. 7, the rack 31 has a both-ends-supported structure in which the longitudinal both ends are fixed to the fixed rail 12L via the fixing device 31B. Thus, the rack 31, especially a longitudinal central part of the rack 31, may be flexurally displaced downward so as to be spaced apart from the pinion 32.

In the present embodiment, however, the sliding device 10L comprising the restrictor 50 can effectively inhibit improper engagement between the pinion 32 and the rack 31.

Other Embodiments

In the sliding device 10L of the above-described embodiment, the driving force from the drive unit 20 is transmitted to the pinion 32 via the intermediate gear 33. However, the present disclosure is not limited to this.

In the above-described embodiment, the first support 41 and the second support 42 that support the pinion 32 and the intermediate gear 33 constitute a one-piece article integrally formed of resin. However, the present disclosure is not limited to this.

For example, it may be possible to employ (a) a one-piece article (a die-cast article) with the first support 41 and the second support 42 integrally formed of metal, (b) a configuration in which the first support 41 and the second support 42 are integrated by being assembled together via a fastener such as a screw, or other configurations.

The above-described embodiment is configured such that the restrictor 43 restricts the upper end 41A of the first support 41 and the upper end 42A of the second support 42 from being spaced apart from each other. However, the present disclosure is not limited to this.

For example, a configuration without the restrictor 43 may be employed. In such a configuration, the first wall 13A and the second wall 13B may contact with the support member 40 to thereby restrict the upper end 41A of the first support 41 and the upper end 42A of the second support 42 from being spaced apart from each other.

The restrictor 43 of the above-described embodiment is configured with the first spacer 43A and the second spacer 43B, each of which is the grommet G. However, the present disclosure is not limited to this.

For example, the restrictor 43 may be formed of metal or resin harder than the grommet G. A configuration may be employed in which the restrictor 43 is fixed to the movable rail 13L and to the support member 40 via a dedicated bolt for fixation, which is different from the bolt B1 described above.

In the above-described embodiment, the restrictor 50 is provided to the support member 40. However, the present disclosure is not limited to this. For example, it may be possible to employ (a) a configuration without the restrictor 50, (b) a configuration in which the restrictor 50 is provided to a member (e.g., the fixed rail 12L) other than the support member 40, or other configurations.

The restrictor 50 of the above-described embodiment comprises the first sliding-contact portion 51 to the third sliding-contact portion 53. However, the present disclosure is not limited to this. For example, a configuration without at least one of the first sliding-contact portion 51 to the third sliding-contact portion 53 may be employed.

The first sliding-contact portion 51 of the above-described embodiment is slidingly contactable with the rack 31 over the entire range along the width axis. However, the present disclosure is not limited to this. For example, a configuration may be employed in which the first sliding-contact portion 51 except for a central portion thereof along the width axis is slidingly contactable with the rack 31.

The rack 31 of the above-described embodiment is a strip-plate-shaped member, and the rack 31 has a both-ends-supported structure in which the longitudinal both ends are fixed to the fixed rail 12L. However, the present disclosure is not limited to this. For example, a configuration may be employed in which the rack 31 comprises teeth to be engaged with the teeth 32A of the pinion 32.

In the above-described embodiments, the vehicle seat for a passenger car is exemplified. However, the present disclosure is not limited to this. The present disclosure can also be applied to seats used in other vehicles, such as railway vehicles, ships, and aircrafts, and to stationary seats used at theaters, homes, and other places.

Furthermore, in the present disclosure, at least two of the above-described embodiments may be combined.

What is claimed is:

1. A sliding device that supports a vehicle seat in a slidable manner, the device comprising:
    a fixed rail fixed to a vehicle;
    a movable rail to which the vehicle seat is fixed, the movable rail being slidable relative to the fixed rail;
    a rack fixed within the fixed rail, the rack extending along an axis parallel to a longitudinal axis of the fixed rail;
    a pinion provided to the movable rail, the pinion comprising multiple teeth to be engaged with the rack and rotating by receiving a driving force; and
    a restrictor slidingly displaced integrally with the movable rail, the restrictor directly contacting with the rack when the movable rail is sliding, to thereby restrict the rack from being displaced in a direction away from the pinion.

2. The sliding device according to claim 1,
    wherein a rotation center of the pinion is positioned upper than the rack, and
    wherein the restrictor comprises a first sliding-contact portion that is slidingly contactable with at least part of a lower surface of the rack.

3. The sliding device according to claim 2,
    wherein, with a horizontal axis substantially perpendicular to a longitudinal axis of the rack being a width axis, the first sliding-contact portion is slidingly contactable with the rack over an entire range along the width axis.

4. The sliding device according to claim 3,
    wherein the restrictor comprises:
        a second sliding-contact portion that is slidingly contactable with one width-axis end side of the rack; and
        a third sliding-contact portion that is slidingly contactable with another width-axis end side of the rack.

5. The sliding device according to claim 1, the device further comprising a support member that is fixed to the movable rail and supports the pinion,
    wherein the restrictor is provided to the support member.

6. The sliding device according to claim 1,
    wherein the rack is a strip-plate-shaped member containing multiple holes into which the multiple teeth of the pinion are insertable.

* * * * *